US007848534B2

(12) United States Patent
Ishibashi et al.

(10) Patent No.: US 7,848,534 B2
(45) Date of Patent: Dec. 7, 2010

(54) SOUND SYSTEM, METHOD FOR CONTROLLING THE SOUND SYSTEM, AND SOUND EQUIPMENT

(75) Inventors: Toshiaki Ishibashi, Shizuoka-ken (JP); Takuro Sone, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 1300 days.

(21) Appl. No.: 11/384,945

(22) Filed: Mar. 17, 2006

(65) Prior Publication Data

US 2006/0210093 A1 Sep. 21, 2006

(30) Foreign Application Priority Data

Mar. 18, 2005 (JP) ............................ 2005-080660

(51) Int. Cl.
*H04R 1/02* (2006.01)
*H04R 9/06* (2006.01)
*H04R 3/00* (2006.01)
*H02B 1/00* (2006.01)

(52) U.S. Cl. ........................ 381/335; 381/111; 381/123

(58) Field of Classification Search ................... 381/80, 381/59, 77, 81, 82, 85, 335, 96, 123, 111; 700/94
See application file for complete search history.

(56) References Cited

U.S. PATENT DOCUMENTS 5,185,680 A * 2/1993 Kakubo ..................... 360/72.2
5,953,432 A 9/1999 Yanagawa et al.

FOREIGN PATENT DOCUMENTS

JP 06-205496 7/1994
JP 3205625 6/2001

* cited by examiner

*Primary Examiner*—Vivian Chin
*Assistant Examiner*—Douglas J Suthers
(74) *Attorney, Agent, or Firm*—Harness, Dickey & Pierce, PLC

(57) ABSTRACT

In each sound unit, when connection with another sound unit is detected, an input control signal is supplied to a control section and then supplied to the adjoining sound unit. Input clock signal is supplied to a PLL section, and an output clock signal from the PLL section is supplied to the adjoining sound unit. Input speaker output signal and microphone input signal are supplied to a speaker output signal processing section and microphone input signal processing section, respectively. The speaker output signal processing section performs predetermined signal processing on an input signal to output the resultant processed signal to a speaker array, and then performs internal delay compensation processing on the signal to output the resultant processed signal to the adjoining sound unit. The microphone input signal processing section calculates a sum of the input signal and sums of delayed signals of outputs from the microphone array and then performs internal delay compensation processing on the signal to output the resultant processed signal to the adjoining sound unit.

14 Claims, 3 Drawing Sheets

SOUND SYSTEM, METHOD FOR CONTROLLING THE SOUND SYSTEM, AND SOUND EQUIPMENT

BACKGROUND OF THE INVENTION

The present invention relates generally to techniques for connecting a plurality of pieces of sound equipment to cause the connected pieces of equipment to function together as a single unit.

In the field of speaker array systems each comprising a plurality of speaker units, there has been known a technique for imparting a sound signal with time delays corresponding to phase differences and providing the resultant delayed sound signals to the individual speakers such that the signals agree in phase only at a desired position (focal point) to which the sound is to be conveyed, so as to form a high sound pressure region (i.e., sound beam) extending toward the focal point or a spot-shaped high sound pressure region (i.e., sound spot) produced at and around the focal point (e.g., Japanese Patent Application Laid-open Publication No. HEI-06-205496 which corresponds to U.S. Pat. No, 5,953,432). Further, in the field of microphone array systems each comprising a plurality of microphone units, there has been known a technique for identifying a sound generation source (sound image localization) on the basis of phase differences and intensity differences of sounds input to the individual microphones, or for separating a plurality of sounds (sound source separation). In each of the above-mentioned techniques, it is necessary to provide a plurality of pieces of sound equipment (speaker units or microphone units).

However, in a speaker array system with a small number of speaker units, there would arise the problems that only a low degree of freedom is permitted as regards positions to localize sound images and directivities of the speakers and that a range of frequencies of produceable sound beams is limited. Namely, in order to achieve an enhanced degree of freedom as regards sound image localization positions and expanded frequency bands of produceable sound beams, it is necessary to increase the number of the speaker units to be provided. However, the increase in the number of the speaker units unavoidably leads to an increased size of the entire apparatus, so that the installing location of the apparatus may be limited and transport of the apparatus may be hindered.

Among conceivable solutions to the aforementioned problems is to juxtapose ten speaker arrays, each comprising ten speaker units, instead of using 100 speaker units. However, merely juxtaposing the plurality of speaker arrays can not allow these speaker arrays to together function as if they were a single speaker array, because, in this case, the speaker arrays only operate independently of each other. In order for the entire set of the speaker arrays to perform a unified function, some correlation, corresponding to operational contents (sound effects), has to be established in advance between timing of sound signal processing to be performed by each of the speaker arrays and timing of sound signal processing to be performed by the other speaker arrays.

SUMMARY OF THE INVENTION

In view of the foregoing, it is an object of the present invention to provide a method and system for connecting a plurality of speaker arrays or microphone arrays (array sound equipment) and controlling the connected sound equipment to together perform a single function.

In order to accomplish the above-mentioned object, the present invention provides an improved sound system comprising a plurality of sound units each including a sound signal processing section and a control section that controls the sound signal processing section. Each of the plurality of sound units comprises: a connection section that connects with at least one of the other sound units to permit communication of a signal between the sound unit and the at least one other sound unit; a connection detection section that detects, via the connection section, connection between the sound unit and at least one other sound unit; and a signal supply section that, when the connection detection section has detected connection between the sound unit and at least one other sound unit and once a control signal, including control information, a clock signal and a sound signal are input from an upstream sound unit via the connection section, supplies the control signal to the control section, supplies the clock signal and sound signal to the sound signal processing section and outputs the clock signal and control signal to a downstream sound unit via the connection section. When the control signal has been supplied to the control section from the signal supply section, the control section controls the sound signal processing section, in accordance with the control information included in the control signal, so that the sound signal processing section performs, on the basis of the control information, signal processing on the sound signal and processing for outputting the sound signal to the downstream sound unit.

When it is determined that the sound unit has been connected with another sound unit or management apparatus, the sound signal processing section is controlled in accordance with a control signal input from the other sound unit or management apparatus. Also, the signal supply section generates a clock signal synchronized with an input clock signal and outputs the generated clock signal to the sound signal processing section and the other sound unit connected with the sound unit. In this way, clock signals, on the basis of which all of the mutually-connected sound units operate, can be synchronized with each other. Further, because the sound signal processing section in each of the sound units supplies the adjoining sound unit with the sound signal with an internal time delay duly compensated for, the entire system can be caused to function as a single sound apparatus.

In a preferred embodiment, the signal supply section includes a clock synchronization circuit that generates a clock signal synchronized with the clock signal input from the upstream sound unit via said connection section and outputs the generated clock signal to the sound signal processing section and the downstream sound unit. In another preferred embodiment, each of the plurality of sound units further comprises a speaker array including a plurality of speaker units, and the sound signal processing section performs, in correspondence with the speaker units, delay processing, intended to realize an acoustic sound field having a desired directional characteristic, on the sound signal supplied from the upstream sound unit, and supplies resultant delayed sound signals to corresponding ones of the speaker units. The sound signal processing section outputs, to the downstream sound unit, the sound signal supplied from the upstream sound unit.

In still another preferred embodiment, each of the plurality of sound units further comprises a microphone array including a plurality of microphone units, and the sound signal processing section outputs, to the downstream sound unit, a sound signal provided by adding 1) signals obtained by performing delay processing, intended to provide a predetermined directional characteristic, on sound signals acquired via the microphone array of the sound unit the sound signal processing section belongs to, and 2) the sound signal supplied from the upstream sound unit. In still another preferred embodiment, in each of the plurality of sound units, the sound signal processing section operates in accordance with a clock signal specific to the sound unit when the connection detection section in the sound unit detects no connection with any other sound unit. In still another preferred embodiment, the sound system further comprises a management apparatus that controls the plurality of sound units, and at least one uppermost-stream sound unit of the plurality of sound units receives the control signal, clock signal and sound signal from the management apparatus rather than from the upstream sound unit.

In still another preferred embodiment, at least one lowermost-stream sound unit of the plurality of sound units outputs, to the management apparatus rather than to the downstream sound unit, a sound signal obtained by performing signal processing, intended to impart a predetermined sound effect, on the sound signal supplied from the upstream sound unit via the connection section. In still another preferred embodiment, each of the plurality of sound units further comprises a signal generation section that generates the control signal and clock signal, and, in at least one of the plurality of sound units, the signal generation section generates and outputs at least the control signal and clock signal to the downstream sound unit, provided that a predetermined condition is met when the connection detection section has detected connection with at least one other sound unit.

According to another aspect of the present invention, there is provided an improved method for operating each of a plurality of sound units in a sound system, each of the sound units including a sound signal processing section and a control section that controls the sound signal processing section. The method comprises: a connection detection step of detecting presence/absence of connection between the sound unit and at least one other sound unit; a signal input step of, when the connection has been detected by the connection detection step, receiving, from an upstream sound unit connected with the sound unit, a control signal, including control information, a clock signal and a sound signal; a sound signal supply step of supplying the sound signal, received by the signal input step, to the signal processing section; a control signal supply step of supplying the control signal, received by the signal input step, to the control section; a signal output step of outputting the clock signal and control signal, received by the signal input step, to a downstream sound unit connected with the sound unit; and a signal processing step of, on the basis of the control information, performing, on the sound signal supplied by the sound signal supply step, signal processing and processing for outputting the sound signal to the downstream sound unit.

According to still another aspect of the present invention, there is provided an improved equipment, which comprises: a control section; a connection section that connects with at least one sound unit to permit communication of a signal between the sound equipment and the at least one other sound unit; a connection detection section that detects, via the connection section, connection between the sound equipment and the at least one other sound unit; a sound signal processing section that performs signal processing on a sound signal in accordance with control information supplied by the control section; a signal supply section that, when the connection detection section has detected connection with at least one sound unit and once a control signal, including control information, clock signal and sound signal are input from an upstream sound unit via the connection section, supplies the control signal to the control section, supplies the clock signal and sound signal to the sound signal processing section and outputs the clock signal and control signal to a downstream sound unit via the connection section; and a sound signal output section that outputs the sound signal, outputted by the sound signal processing section, to the downstream sound unit.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

[Construction]

<1. Construction of Sound Unit>

Figure 1:
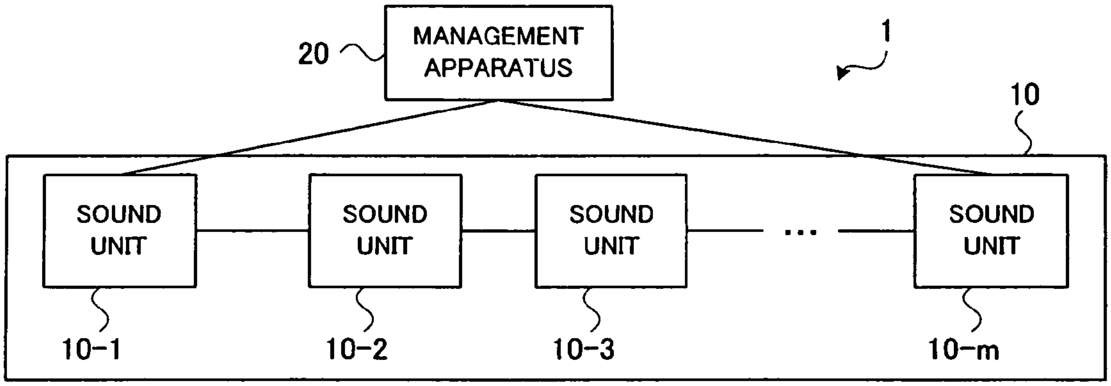
FIG. 1 is a block diagram showing a general setup of a sound system in accordance with en embodiment of the present invention.

FIG. 1 is a block diagram showing a general setup of a sound system 1 in accordance with an embodiment of the present invention. As shown, the sound system 1 comprises a set of m (m represents an arbitrary natural number) sound units 10 (10-1, 10-2, 10-3, . . . , 10-m;) connected with one another, and a management apparatus 20 for controlling all of the sound units 10. Each of the sound units 10, except for two sound units located in opposite ends of the sound unit set, is connected with adjoining sound units, so that the sound units 10 constitute a chained-together sound unit set. Only the two sound units 10-1 and 10-m located in the opposite ends of the sound unit set are connected to the management apparatus 20. In the following description, the sound units 10-1, 10-2, 10-3, . . . , 10-m are assumed to be similar in function and will be referred to simply as "sound units 10" unless it is necessary to distinguish among the individual sound units.

Figure 2:
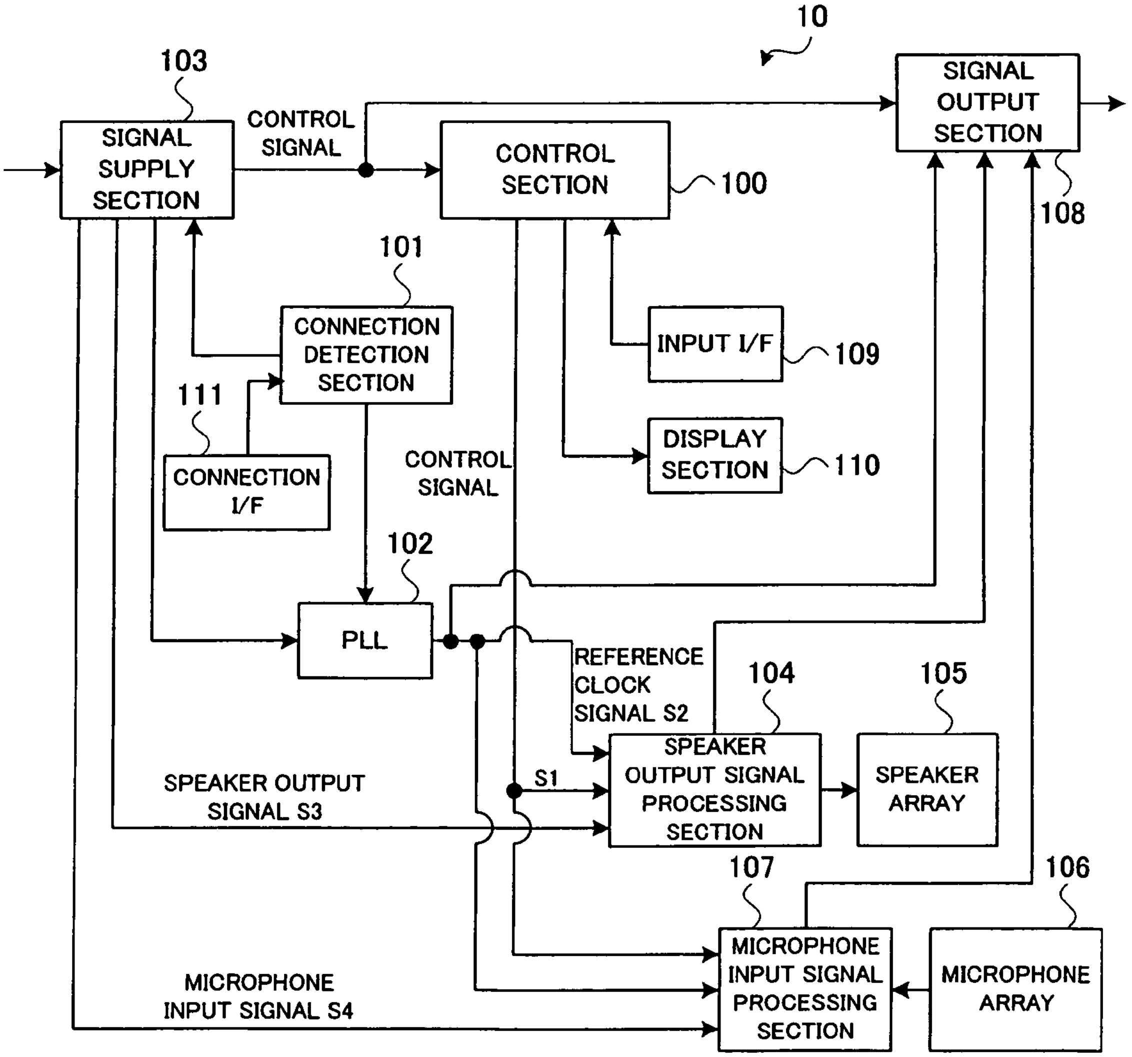
FIG. 2 is a functional block diagram of each sound unit in the sound system of FIG. 1.

FIG. 2 is a functional block diagram of each of the sound units 10. As shown, each of the sound units 10 comprises a control section 100, a connection detection section 101, a PLL 102, a signal supply section 103, a speaker output signal processing section 104, a speaker array 105, a microphone array 106, a microphone input signal processing section 107, a signal output section 108, an input I/F section 109, a display section 110, and a connection I/F 111.

The control section 100 includes a control processor, such as a CPU, that controls various sections and components of the sound unit 10. When the sound unit 10 is connected with one or two other control units 10 or with the management apparatus 20, the control section 100, upon receipt of control signals, extracts therefrom control information directed to the sound unit 10 it belongs to (hereinafter referred to as "sound unit in question" for convenience of explanation) and controls the speaker output signal processing section 104 and microphone input signal processing section 107 in accordance with the extracted control information, as will be later described in detail. The connection detection section 101 determines whether the sound unit 10 is connected with one or two other sound units 10 via the connection I/F 111 over a cable etc. If the connection detection section 101 has detected any other sound unit 10 connected with the sound unit 10, it supplies a predetermined signal to the signal supply section 103 and PLL 102. When a clock signal has been input from another sound unit 10 via the signal supply section 103, the PLL 102 outputs a clock signal synchronous with the input clock signal. The clock signal output from the PLL 102 is supplied to the processing section 104 and microphone input signal processing section 107 of the sound unit 10 in question, and to another sound unit 10 connected to the sound unit 10 in question. The signal supply section 103 is an interface for receiving various signals from another sound unit 10 connected with the sound unit 10 in question via the connection I/F 111. When the connection detection section 101 has detected connection, with another sound unit, of the sound unit 10 in question and once a control signal S1 is input, the signal supply section 103 outputs the input control signal S1 to the sound unit connected via the connection I/F 111 with the sound unit 10 in question and to the control section 100. Further, once a reference clock signal S2 is input, the signal supply section 103 passes the input reference clock signal S2 to the PLL 102. Furthermore, once a speaker output signal S3 is input, the signal supply section 103 passes the input speaker output signal S3 to the speaker output signal processing section 104. Furthermore, once a microphone input signal S4 is input, the signal supply section 103 passes the microphone input signal S4 to the microphone input signal processing section 107. The leftmost sound unit 10-1 in FIG. 1 receives the above-mentioned various signals from the management apparatus 20, rather than from another sound unit 10.

The speaker output signal processing section 104 includes a delay circuit for, on the basis of parameters from the control section 100, providing phase differences necessary to generate a sound wave having a directional characteristic, a D/A converter circuit, and a processor for processing various sound signals. The speaker output signal processing section 104 performs predetermined delay processing on a generated signal to achieve desired phase differences and supplies the resultant delayed signals to individual speaker units of the speaker array 105. The sound unit 10 also includes a not-shown quartz oscillator for generating fixed clock signals, and the speaker output signal processing section 104 performs speaker output signal processing on the basis of the clock signals. When the sound unit 10 is to operate in operationally-connected relation to other sound units, the speaker output signal processing section 104 performs predetermined delay processing on a speaker output signal input via the signal supply section 103, then outputs the resultant delayed signals to the speaker array 105, and also supplies, via the signal output section 108, the speaker output signal to another sound unit connected to the sound unit 10 in question. Such signal processing will be later described in detail. The speaker array 105 comprises a plurality of speaker units (not shown) and produces audible sounds in accordance with signals supplied from the speaker output signal processing section 104.

The microphone array 106 includes a plurality of microphones for collecting or picking up a sound and supplies thus-acquired sound signals to the microphone input signal processing section 107. The term "sound" is used herein to refer to a musical sound in the broader sense of the words, rather than a human voice in the narrow sense of the words.

The microphone input signal processing section 107 includes an A/D conversion circuit and a sound signal processor, and it performs predetermined delay processing and the like on the sound signals acquired via the microphone array 106 and supplies the resultant signals to outside the sound unit 10 via the signal output section 108. Further, the microphone input signal processing section 107 includes a not-shown quartz oscillator for generating fixed clock signals and performs microphone input signals on the basis of the clock signals. When the sound unit 10 is to operate in operationally-connected relation to other sound units, the microphone input signal processing section 107 performs predetermined delay processing and the like on the sound signals acquired via the microphone array 106, then adds the resultant processed signals and microphone input signals supplied from another sound unit 10 connected with the sound unit 10 in question, and then supplies the resultant signals to the other sound unit 10 connected with the sound unit 10 in question. The signal processing will be later described in detail.

The signal output section 108 is an interface for supplying the speaker output signals and microphone input signals to the other sound unit 10. However, for the rightmost sound unit 10-m in FIG. 1, the microphone input signals are supplied to the management apparatus 20. The input I/F 109 is an input device, such as a keyboard, and, when the sound unit 10 in question is to operate independently or by itself, the input I/F 109 is used for a user or human operator of the sound unit 10 in question to input parameters for designating a sound wave of a predetermined directional characteristic to be generated from the speaker array 105 (e.g., direction, intensity level, etc. of a sound beam). The display section 110, which comprises a liquid crystal display or the like, displays currently-set parameters etc. to allow the user to visually check the parameters etc.

<2. Management Apparatus 20>

Figure 3:
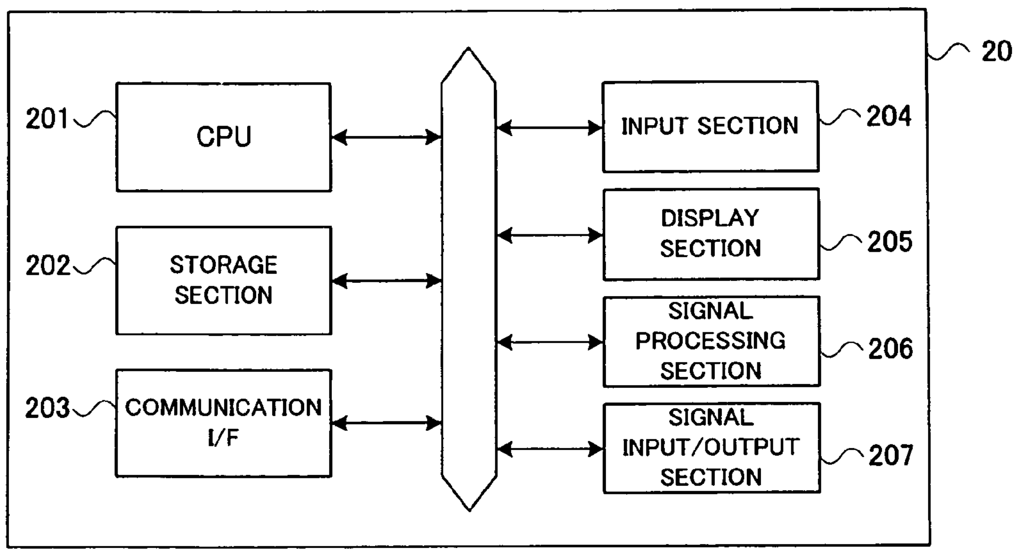
FIG. 3 is a functional block diagram of a management apparatus in the sound system of FIG. 1.

FIG. 3 is a functional block diagram of the management apparatus 20. As shown, the management apparatus 20 includes a CPU 201, a storage section 202, a communication I/F 203, an input section 204, a display section 205, a signal processing section 206, and a signal input/output section 207. The CPU 201 controls various components and sections of the management apparatus 20. In the storage section 202, there are prestored parameters necessary to generate control signals to be used for controlling all of the sound units 10 managed by the management apparatus 20.

The communication I/F 203 is a communication interface, connected with at least one sound unit 10 (in the illustrated example of FIG. 1, sound units 10-1 and 10-m) via a communication cable or the like, for communicating various signals to be later described. The input section 204 is an input device, such as a combination of a keyboard and mouse, which is used by a user or human operator of the management apparatus 20 to input the above-mentioned parameters and other data. The display section 205 comprises a liquid crystal display or the like, which allows the user of the management apparatus 20 to visually check various information when the user inputs the information. The signal processing section 206 calculates parameters to be supplied to the sound units 10. The signal input/output section 207 is an interface which not only inputs, from an external sound generator device or the like, sound signals to be supplied to the speaker array 105 of each of the sound units 10 but also outputs, to an external speaker device or the like, sound signals acquired via the microphone array 106 of each of the sound units 10.

[Signal Processing]As noted above, each of the sound units 10 can operate as an ordinary speaker array or microphone array by itself, i.e. without being connected with any other sound unit 10 via the connection I/F 111. The following paragraphs describe example behavior of each of the sound units 10 when it operates by itself or independently.

<1. Independent Operation>

Figure 4:
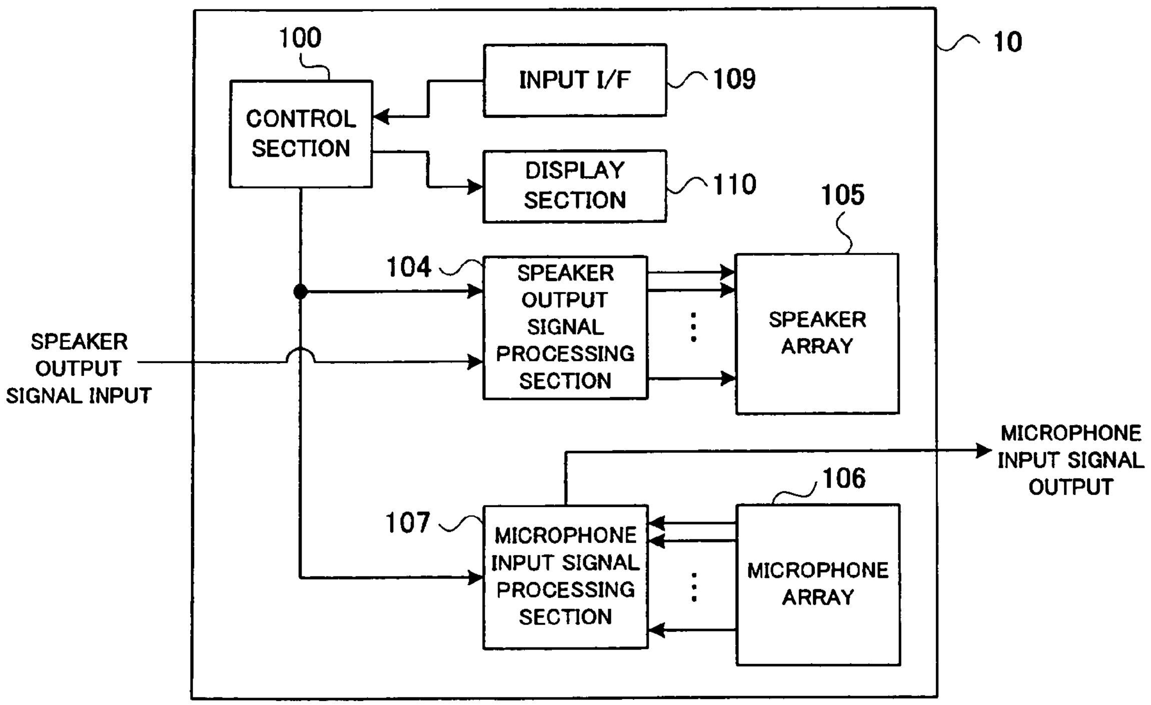
FIG. 4 is a diagram explanatory of signal flows when a given one of the sound units operates independently of the other sound units.

A description will be given below about how each of the sound units 10 operates by itself or independently, with reference to FIG. 4. The connection detection section 101 outputs no signal to the signal supply section 103 unless it detects that any other sound unit 10 has been connected to the sound unit 10 in question; thus, in this case, no reference clock signal is supplied from the signal supply section 103, so that the speaker output signal processing section 104 and microphone input signal processing section 107 operate on the basis of fixed clock signals generated within the sound unit 10 in question, as noted above. In this way, the sound unit 10 operates as an ordinary speaker array and microphone array. When the sound unit 10 is to function as a speaker array, the control section 100 supplies the speaker output signal processing section 104 with parameters input via the input I/F 109, as a result of which the speaker array 105 generates a sound wave having a desired directional characteristic. Namely, an acoustic sound field having the desired directional characteristic is realized by the speaker array. When the sound unit 10 is to function as a microphone array, on the other hand, sounds picked up by the microphone array 106 are supplied to the microphone input signal processing section 107, where the sounds are subjected to delay processing etc. on the basis of parameters input via the input I/F 109. As a result, there can be acquired signals of only sounds arriving from a desired sound generator device. The thus-acquired sound signals can be supplied to an external device, such as a speaker (or may be supplied to the speaker output signal processing section 104 of the sound unit 10 in question).

<2. Operation When Connected with Other Sound Units>

Next, with reference to FIG. 5, a description will be given about operation of each of the sound units 10 when its is connected with other sound units 10 via the connection I/F 111 as illustrated in FIG. 1. Let it be assumed that parameters necessary to connect the individual sound units 10 so as to together function as a speaker array or microphone array are prestored in the storage section 202 of the management apparatus 20. Further, the CPU 201 of the management apparatus 20 keeps intermittently monitoring whether the management apparatus 20 has been connected with any sound unit via the communication I/F 203, and, once such connection is detected, the CPU 201 transmits a predetermined control signal to the sound unit 10 connected to the management apparatus 20. The control signal, which may be of any desired format, includes an identifier identifying the connected sound unit 10 and control information to be supplied to the sound unit 10.

Figure 5:
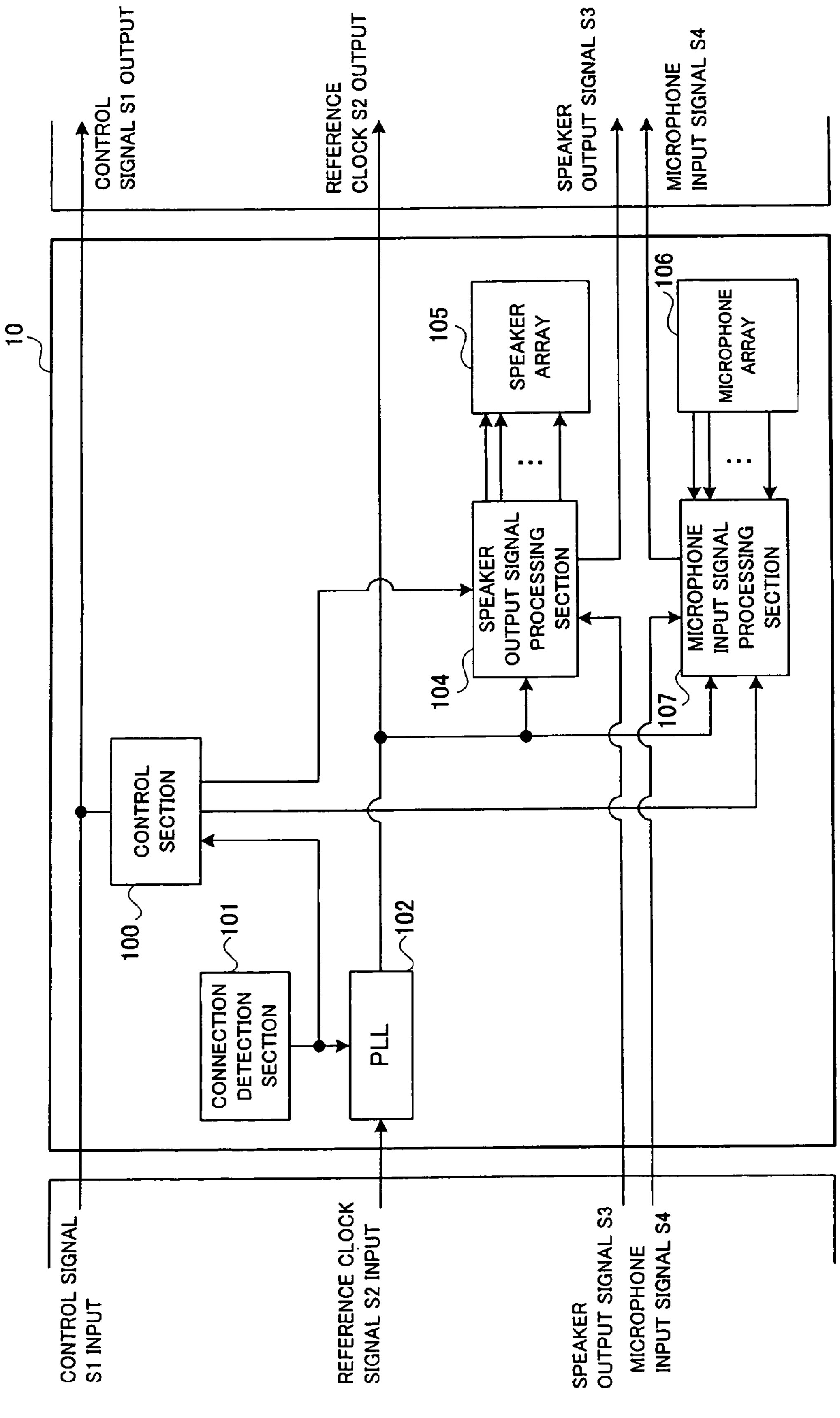
FIG. 5 is a diagram explanatory of signal flows when a given one of the sound units operates in an operationally-connected relation to other sound units.

FIG. 5 is a diagram explanatory of signal flows in the sound unit 10-n (n is a given one of numbers 2, 3, . . . , m−1) connected to the sound unit 10-(n−1) (namely "upstream sound unit") and sound unit 10-(n +1) (namely "downstream sound unit"). Once the sound unit 10-n is connected to the upstream sound unit 10-(n−1), a control signal S1 and reference clock signal S2 are supplied from the upstream sound unit 10-(n−1) to the sound unit 10-n. The following paragraphs describe processing on these signals.

Once a predetermined control signal is supplied to the control section 100, the control section 100 is switched from an independent operation mode to a connected operation mode. More specifically, the control section 100 has prestored therein identification information identifying itself, and, upon receipt of a control signal containing a plurality of pieces of identification with respective identifiers attached thereto, the control section 100 extracts the identification information, corresponding to the identifier that matches the identification information stored in the sound unit 10-n in question, as control information for the sound unit 10-n, and then it controls the speaker output signal processing section 104 and microphone input signal processing section 107 in accordance with the extracted control information. At that time, even if control information, such as a parameter, has been input via the input I/F 109, this input control information is not supplied to the speaker output signal processing section 104 or microphone input signal processing section 107. Thus, any instruction given by the user of the sound unit 10-n via the input I/F 109 is ignored in the sound unit 10-n, so that the sound unit 10-n operates only on the basis of control signals transmitted from the management apparatus 20 and supplied to the sound unit 10-n by way of the sound unit 10-(n−1).

Once the connection detection section 101 detects that any other sound unit 10 (in the illustrated example, sound unit 10-(n−1)) has been connected to the connection I/F 111, predetermined signals are supplied to the control section 100 and PLL 102. As a consequence, the PLL 102 is activated so that clock signals synchronized with the reference clock signals of the sound unit 10-(n−1) are generated. The thus-generated clock signals are supplied to the speaker output signal processing section 104 and microphone input signal processing section 107. Thus, the speaker output signal processing section 104 and microphone input signal processing section 107 of the sound unit 10-n operate in synchronism with operation timing of the speaker output signal processing section 104 and microphone input signal processing section 107 of the sound unit 10-(n−1). The generated clock signals are also supplied to the downstream sound unit 10-(n+1). Consequently, the PLL 102 in the downstream sound unit 10-(n+1) operates in a similar manner to that in the sound unit 10-n, as a result of which the speaker output signal processing section 104 and microphone input signal processing section 107 of the downstream sound unit 10-(n+1) operate in synchronism with operation timing of the speaker output signal processing section 104 and microphone input signal processing section 107 of the sound unit 10-n. Similarly, the reference clock signals of the downstream sound unit 10-(n+1) are supplied to a further downstream sound unit 10-(n+2) on after another. Thus, the operation timing of the speaker output signal processing sections 104 and microphone input signal processing sections 107 of all of the mutually-connected sound units 10 can be synchronized by synchronizing, sequentially in a left-to-right direction of FIG. 1, the reference clock signals to be supplied to the speaker output signal processing sections 104 and microphone input signal processing sections 107 of the individual sound units 10.

Next, a description will be given about details of operation of the speaker output signal processing section 104. The speaker output signal processing section 104 delays a speaker output signal S3, supplied from the signal supply section 103, by delay times corresponding to the speakers constituting the speaker array 105. Also, the speaker output signal processing section 104 directly outputs the speaker output signal S3, supplied from the signal supply section 103, to the downstream sound unit 10-(n+1). Thus, the same speaker output signal S3 is supplied to the subsequent downstream sound unit 10-(n+1) or units one after anther.

In each of the sound units, there would be unavoidably produced a time delay of a signal in the course of transfer of the signal. Because such a time delay increases as the number of the signal transfer increases, delay parameters, comprising a combination of delay amount parameters intended to provide a directional characteristic and delay amount parameters intended to compensate for a transfer delay between the sound units, are set in each of the sound units 10. Note that the transfer delay occurs while the sound signal, namely the speaker output signal S3, is transferred to the downstream sound unit and a subsequent downstream sound unit or units one after another. Because the operation timing of the individual speaker output signal processing sections 104 is synchronized through the clock synchronization as set forth above, all of the speaker arrays 105 are allowed to function as a single speaker array.

Now, details of operation of the microphone input signal processing sections 107 will be described. If $x^{in}_n(t)$ represents a microphone input signal S4 (namely microphone sound signal) supplied from the sound unit 10-(n−1), $x^{out}_n(t)$ represents a microphone input signal S4 (namely microphone sound signal) supplied from the sound unit 10-n, the following relationship can be established in the signal processing in the microphone input signal processing sections 107:

$$x^{out}_n(t)=x^{in}_n(t)+M_n(t) \qquad \text{Numerical Expression (1)}$$

Here, $M_n$ represents a value obtained by performing delay processing, necessary to achieve a desired directional characteristic, on each of output signals from the individual microphones constituting the microphone array 106 in the sound unit 10-n and then adding together the resultant delayed signals. As seen from Numerical Expression (1) above, the signal $M_n$, representative of the sum of the sound signals output from the microphones constituting the microphone array 106 in the sound unit 10 in question, is added to microphone input signal supplied from one adjoining sound unit 10, and then the result of the addition is output to another adjoining sound unit 10. As with the speaker output signal S3, there would be unavoidably produced a transfer time delay in the signal Mn (namely the microphone input signal S4) due to each signal transfer between the sound units. Also, the transfer time delay occurs while the microphone sound signal, namely the microphone input signal S4, is transferred to the downstream sound unit and a subsequent downstream sound unit or units one after another. Thus, let it be assumed here that compensation for the transfer time delay is included (performed) in delay processing necessary for the microphone input signal processing section 107 to obtain a directional characteristic. In this way, the signal from the microphone array in the sound unit 10 in question is sequentially added to the microphone input signals. The rightmost sound unit 10-m in FIG. 1 outputs the microphone input signal, having been subjected to the delay processing, to the management apparatus 20. Because there is no microphone-input-signal supplying device for the leftmost sound unit 10-1, the leftmost sound unit 10-1 outputs a signal $x^{out}_1(t)$ obtained by performing delay and addition processing on the microphone array input signals of that sound unit 10-1.

As a consequence, to the management apparatus 20, there is supplied a sum (delayed signal sum) of signals obtained by cumulatively adding respective summed signals from the microphone arrays 106 of all of the sound units 10 (10-1, 10-2, . . . , 10-m). Namely, by the microphone input signal processing section 107 of each of the sound units 10 performing signal processing based on Numerical Expression (1) above, signals obtained by cumulatively adding summed signals from all of the sound units 10 with appropriate delay control performed thereon are supplied to the management apparatus 20, so that the microphone arrays of the sound units 10 are allowed to function together as a single microphone array.

As having been explained above, the sound system 1 of the present invention is characterized by the management apparatus 20 performing, on each of the sound units 10 connected together into a chain configuration, the processing to compensate for internal delays in the individual sound units 10, while supplying control information to either one of the speaker output signal processing sections 104 and microphone input signal processing sections 107 synchronized with each other in terms of their operating clock signals. Thus, the plurality of mutually-connected sound units are allowed to function together as a single speaker array or microphone array. Further, if parameter values are set in accordance with the installed positions and installed number of the sound units 10, it is possible to freely vary the positional arrangement of each of the sound units 10.

[Modification]

The present invention should never be construed as limited to the above-described embodiment and may be modified variously as set forth below by way of example.

The number of the sound units 10 may be chosen as desired, and the scheme for geographical layout of the sound units 10 is not limited to the aforementioned. Regarding the positional arrangement, for example, the sound units 10 may be arranged linearly or two- or three-dimensionally, as long as the above-mentioned signals S1 and S4 can be supplied to all of the sound units 10 used. Further, the transfer paths of the microphone input signals S4 (i.e., order in which the microphone input signals S4 are cumulative added) may be chosen as desired, as long as the signals of the microphone arrays 106 of the individual sound units 10 are cumulatively added only once.

The embodiment has been described as arranged in such a manner that the user of the management apparatus 20 inputs information pertaining to the positions of the individual sound units 10 and then the management apparatus 20 sets parameters, optimal to the individual sound units 10, in the sound units 10 on the basis of the input information. However, the present invention is not so limited. For example, each of the sound units 10 may be provided with a mechanism, such as a GPS, for acquiring a current position of the sound unit 10, and each of the sound units 10 may transmit, via wired or wireless communication, the identifier and position information (position coordinates or relation position to any one of the sound units 10 adjoining the sound unit in question) of the sound unit. In this case, the management apparatus 20, having received the position information of each of the sound units 10, calculates parameter values of the sound unit 10 using the received information and information of sound image localization position or position of a sound source.

Whereas the embodiment has been described above in relation to the case where the speaker output signal S3 and the microphone input signal S4 are identical in transfer direction, these signals S3 and S4 may be in opposite transfer directions. Namely, in the illustrated example of FIG. 5, the sound unit 10-n receives the microphone input signal S4 from the sound unit 10-(n+1), then adds, to the received microphone input signal S4, sound signals picked up by the sound unit 10-n, and then supplies the resultant added signal to the sound unit 10-(n−1). With such arrangements, one of the sound units (in this instance, sound unit 10-1) is allowed to function as a input/output I/F for the speaker and microphone input signals to be communicated between the management apparatus 20 and the sound units 10.

Further, whereas the above-described embodiment includes the management apparatus 20 as a means for controlling each of the connected sound units 10, the present invention is not so limited. For example, the functions of the management apparatus 20 may be performed by each of the sound units 10. In such a case, any one of the connected sound units 10 is set as master equipment also playing the role of the management apparatus 20, while the remaining sound units are set as slave equipment. More specifically, each of the sound units is provided with an input section operable to input a user's instruction, a display section for presenting various messages to the user, an arithmetic operation section for calculating values of parameters related to the delay processing, a storage section having parameters etc. prestored therein, and a selection section for selecting from among a clock signal and control signal input via the signal supply section 103, fixed clock signal and control information generated by the arithmetic operation section. In the sound unit set as the master equipment through operation by the user or otherwise, the selection section selects the fixed clock signal and control signal generated by the arithmetic operation section and supplies the selected clock signal and control signal to the sound signal processing section of that sound unit and another sound unit connected to that sound unit. In each of the sound units set as the slave equipment, on the other hand, the selection section selects the clock signal and control signal input via the signal supply section 103, and supplies the selected clock signal and control signal not only to the sound signal processing section of that sound unit but also to each of the other sound units connected with that sound unit. The control signal contains identification information of the sound unit to which the control signal is to be transmitted, and each of the sound units takes in the control signal only when the identification information on the received control signal matches identification information prestored in the control section 100 of that sound unit.

Thus, irrespective of which one of the sound units 10 has been set as the master equipment, the ultimately-cumulatively-added microphone input signal can be supplied to the sound unit 10 as the master equipment. For example, in the case where the sound units 10 are arranged in a straight linear configuration as in the above-described embodiment, and if the rightmost or leftmost sound unit is not set as the master equipment, the master equipment only has to receive the cumulatively-added microphone input signal from each of the rightmost and leftmost sound units and cumulatively add the received microphone input signals and the signal from the microphone array 106 of the sound unit 10 in question. With such arrangements, it is possible to achieve functions similar to the functions of the above-described embodiment of the sound system 1.

Any one of the sound units 10 to be set as the master equipment may be determined in any other suitable manner than the aforementioned. For example, each of the sound units 10 may be provided with a selection switch for switching between the functions of the master equipment and slave equipment, so that the user of each of the sound units 10 can operate the selection switch to set a desired one of the sound units 10 as the master equipment and set the other sound units as the slave equipment. Alternatively, the connection I/F 111 may comprise two types of connection connectors (e.g., connector A and connector B) instead of the sound unit being provided with the selection switch; in this case, only connector A is used for one of the sound units to be set as the master equipment when the one sound unit is to be connected to the other sound units, and only connector B is used for each of the sound units to be set as the slave equipment when the sound unit is to be connected to the other sound units. For example, the master equipment requests the sound-unit identifying ID of each of the sound units connected thereto as the slave equipment. Then, each of the sound units, having received the request or query, forwards the query to another sound unit connected therewith if any. If no other sound unit is connected with the sound unit in question (e.g., if the sound unit in question is the leftmost or rightmost sound unit), the sound unit in question returns a response with a time stamp and ID of the sound unit attached thereto. Once the response with the sound unit ID attached thereto is received, each of the sound units further attaches a time stamp and ID of itself to the received response and then forwards the response to the other sound unit. Thus, once such responses are ultimately returned to the sound unit currently set as the master equipment, the sound unit (master equipment) determines, from the time stamps and IDs, the sound units connected thereto as slave equipment and the number of the connected sound units, and it also acquires, from the time stamp information, arrangement information of the sound units (e.g., order in which the sound units are connected, form of the connection, geographical layout of the sound units, etc.). In another alternative, each of the sound units may be provided with a wireless communication I/F, so that, once connection with another sound unit is detected via the connection I/F 111, the sound unit can use the wireless communication I/F to transmit a query as mentioned above, or carry out negotiation between the sound units as regards setting of the master and slave equipment.

The sound unit 10, functioning as the lowermost stream point of the sound signal flow, may use a predetermined external input/output I/F to output the sound signal not only to the management apparatus 20 but also to another or external sound apparatus. Further, if necessary, the sound signal may be subjected to predetermined conversion processing before being output. For example, the sound signal may be output after being subjected to D/A conversion in a case where it is to be supplied to an apparatus having an analog input/output I/F, or may be transmitted after being subjected to conversion into a predetermined data format in a case where it is to be supplied via a network, such as the Internet. Furthermore, whereas the connection between the sound units 10 and the connection between the sound units 10 and the management apparatus 20 in the above-described embodiment has been described as achieved by wired connection, these connection may be by wireless connection.

Furthermore, in the above-described sound system 1, it is not necessary to use all of the sound units 10 physically connected with each other; namely, it is not necessary to cause all of the connected sound units 10 to participate in the array mechanism. For example, in the case where the sound units 10-1-10-m are arranged in a linear configuration, particular sound units to be used may be selected in accordance with a sound image localization position and position of a sound source. Furthermore, if very high degree of freedom is not required in terms of the directional characteristic or frequency band, only odd-numbered sound units 10 of the sound units 10-1 -10-m may be selectively used.(i.e., may be selectively caused to operate). In such a case, predetermined flag information may be included in the control signal S1 in association with the IDs of the sound units that are not caused to participate in the array mechanism. When each of such non-participating sound units has received the predetermined flag information, the speaker output signal processing section 104 of that sound unit passes the received speaker output signal directly to an adjoining sound unit without supplying the speaker output signal to the speaker array 105, and the microphone input signal processing section 107 passes the received microphone input signal directly to the adjoining sound unit without adding the sound signals, supplied from the corresponding microphone array 106, to the microphone input signal. Namely, each of the sound units 10, which are mechanically connected but do not participate in the sound system 1, may be constructed to supply the input signals S1-S4 to another sound unit 10 without performing any particular processing on the signals S1-S4.

What is claimed is:

1. A sound system comprising a plurality of sound units each including a sound signal processing section and a control section that controls the sound signal processing section, each of said plurality of sound units comprising:

a connection section that connects with at least one other said sound unit to permit communication of a signal between said sound unit and the at least one other sound unit;

a connection detection section that detects, via said connection section, connection between said sound unit and at least one other said sound unit; and a signal supply section that, when said connection detection section has detected connection between said sound unit and at least one other said sound unit and once a clock signal, a sound signal, and a control signal including control information are input from an upstream sound unit via said connection section, supplies the control signal to said control section, supplies the clock signal and the sound signal to said sound signal processing section and outputs the clock signal and the control signal to a downstream sound unit via said connection section, wherein, when the control signal has been supplied to said control section from said signal supply section, said control section controls said sound signal processing section, in accordance with the control information included in the control signal, so that said sound signal processing section performs, on the basis of the control information, signal processing on the sound signal and processing for outputting the sound signal to the downstream sound unit.

2. A sound system as claimed in claim 1 wherein said signal supply section includes a clock synchronization circuit, that generates a clock signal synchronized with the clock signal input, from the upstream sound unit via said connection section and outputs the generated clock signal to said sound signal processing section and the downstream sound unit.

3. A sound system as claimed in claim 1 wherein each of said plurality of sound units further comprises a speaker array including a plurality of speaker units, and wherein said sound signal processing section performs, in correspondence with said speaker units, delay processing, intended to realize an acoustic sound field having a desired directional characteristic, on the sound signal supplied from the upstream sound unit, and supplies resultant delayed sound signals to corresponding ones of said speaker units.

4. A sound system as claimed in claim 3 wherein said sound signal processing section outputs, to the downstream sound unit, said sound signal supplied from the upstream sound unit.

5. A sound system as claimed in claim 4 wherein said sound signal processing section performs said delay processing so as to realize said acoustic sound field and compensate for a transfer delay which occurs while said sound signal is transferred to the downstream sound unit and a subsequent downstream sound unit or units one after another.

6. A sound system as claimed in claim 1 wherein each of said plurality of sound units further comprises a microphone array including a plurality of microphone units, and wherein said sound signal supplied, via said signal supply section, from said upstream sound unit to said sound signal processing section is a microphone sound signal output from the upstream sound unit., and wherein said sound signal processing section outputs, to the downstream sound unit, a new microphone sound signal provided by adding 1) signals obtained by performing delay processing, intended to provide desired directional characteristics, on sound signals acquired via said microphone array of the sound unit said sound signal processing section belongs to, and 2) said microphone sound signal output from the upstream sound unit.

7. A sound system as claimed in claim 6 wherein said sound signal processing section performs said delay processing so as to provide said desired directional characteristics and compensate for a transfer delay which occurs while said microphone sound signal is transferred to the downstream sound unit and a subsequent downstream sound unit or units one after another.

8. A sound system as claimed in claim 1 wherein, in each of said plurality of sound units, said sound signal processing section operates in accordance with a clock signal specific to said sound unit when said connection detection section in said sound unit detects no connection with any other said sound unit.

9. A sound system as claimed in claim 1 which further comprises a management apparatus that controls said plurality of sound units, and wherein at least one uppermost-stream sound unit of said plurality of sound units receives the control signal, the clock signal and the sound signal from said management apparatus rather than from the upstream sound unit.

10. A sound system as claimed in claim 1 which further comprises a management apparatus that controls said plurality of sound units, and wherein at least one lowermost stream sound unit of said plurality of sound units outputs, to said management apparatus rather than to the downstream sound unit, a sound signal obtained by performing signal processing, intended to impart a predetermined sound effect, on the sound signal supplied from the upstream sound unit via said connection section.

11. A sound system as claimed in claim 1 wherein each of said plurality of sound units further comprises a signal generation section that generates the control signal and the clock signal, and wherein, in at least one of said plurality of sound units, said signal generation section generates and outputs at least the control signal and the clock signal to the downstream sound unit, provided that a predetermined condition is met when said connection detection section has detected connection with at least one other said sound unit.

12. A sound system as claimed in claim 1 wherein the control information is determined on the basis of a total number of said plurality of sound units.

13. A method for operating each of a plurality of sound units in a sound system, each of said sound units including a sound signal processing section and a control section that controls the sound signal processing section, said method comprising a connection detection step of detecting presence/absence of connection between said sound unit and at least one other said sound unit a signal input step of, when the connection has been detected by said connection detection step, receiving, from an upstream sound unit connected with said sound unit, a clock signal, a sound signal, and a control signal including control information, a sound signal supply step of supplying the sound signal, received by said signal input step, to said signal processing section;

a control signal supply step of supplying the control signal, received by said signal input step; to said control section;

a signal output step of outputting the clock signal and the control signal, received by said signal input step, to a downstream sound unit connected with said sound unit; and a signal processing step of, on the basis of the control information, performing, on the sound signal supplied by said sound signal supply step, signal processing and processing for outputting the sound signal to the downstream sound unit.

14. A non-transitory computer-readable storage medium having stored thereon a group of instructions for causing a computer of a sound unit to perform a procedure for operating said sound unit, said sound unit including a sound signal processing section and a control section that controls the sound signal processing section, said procedure comprising:

a connection detection step of detecting presence/absence of connection between said sound unit and at least one other said sound unit;

a signal input step of, when the connection has been detected by said connection detection step receiving, from an upstream sound unit connected with said sound unit, a clock signal, a sound signal, and a control signal including control information;

a sound signal supply step of supplying the sound signal, received by said signal input step, to said signal processing section;

a control signal supply step of supplying the control signal, received by said signal input step; to said control section;

a signal output step of outputting the clock signal and the control signal, received by said signal input step, to a downstream sound unit connected with said sound unit; and a signal processing step of, on the basis of the control information, performing, on the sound signal supplied by said sound signal supply step, signal processing and processing for outputting the sound signal to the downstream sound unit.

* * * * *